United States Patent
Valasek et al.

(10) Patent No.: US 8,297,103 B2
(45) Date of Patent: Oct. 30, 2012

(54) METHOD AND APPARATUS FOR MEASUREMENT AND/OR CALIBRATION OF POSITION OF AN OBJECT IN SPACE

(75) Inventors: Michael Valasek, Prague (CZ); Frantisek Petru, Sezimovo Ústí (CZ); Zbynek Sika, Prague (CZ); Václav Bauma, Prague (CZ); Roman Smid, Tabor (CZ)

(73) Assignees: Czech Technical University In Prague, Prague (CZ); INOMECH S.R.O., Tabor (CZ)

( * ) Notice: Subject to any disclaimer, the term of this patent is extended or adjusted under 35 U.S.C. 154(b) by 948 days.

(21) Appl. No.: 12/159,301

(22) PCT Filed: Dec. 20, 2006

(86) PCT No.: PCT/CZ2006/000093
§ 371 (c)(1),
(2), (4) Date: Sep. 3, 2008

(87) PCT Pub. No.: WO2007/076731
PCT Pub. Date: Jul. 12, 2007

(65) Prior Publication Data
US 2009/0183550 A1    Jul. 23, 2009

(30) Foreign Application Priority Data

Jan. 4, 2006   (CZ) .................. PV 2006-9

(51) Int. Cl.
*G01B 5/00* (2006.01)
*G01B 21/04* (2006.01)
*G01B 21/00* (2006.01)
*B25J 19/02* (2006.01)
*B25J 19/00* (2006.01)

(52) U.S. Cl. .......... 73/1.79; 73/1.75; 73/866.5
(58) Field of Classification Search .......... 73/1.79, 73/1.75, 866.5; 33/502
See application file for complete search history.

(56) References Cited

U.S. PATENT DOCUMENTS
2,378,334 A * 6/1945 Sirvent .................. 33/501.05
(Continued)

FOREIGN PATENT DOCUMENTS
DE        4334582 A1 *   4/1995
(Continued)

OTHER PUBLICATIONS

Michail Valasek, "Redundant Actuation and Redundant Measurement—The mechatronic principles for future machine tools", International Congress on Mechatronics 2004, Jul. 9, 2004, pp. 131-144.
Yu-Jen Chiu et al., "Self-calibration of a general hexapod manipulator with enhanced precision in 5-DOF motions", Mechanism and Machine Theory, No. 39, 2004, pp. 1-23.
(Continued)

*Primary Examiner* — Thomas P Noland
(74) *Attorney, Agent, or Firm* — Weingarten, Schurgin, Gagnebin & Lebovici LLP

(57) ABSTRACT

The invention concerns a method of and apparatus for measurement and/or calibration of the position of an object in space in such embodiment where the apparatus contains at least one moving arm fitted to the frame on one end and on the other end fitted to a platform, where the platform can be attached to the object to be measured or calibrated; during the motion of the object with the platform attached the relative positions of individual members of at least one moving arm, frame and platform are read and the measured data is used for determination of the position of the object or for its calibration. Upon attaching the platform of the measurement and/or calibration apparatus to the measured or calibrated object, these joined parts perform an arbitrary motion within object's operating space actuated by the drives of the object, while the quantities corresponding to relative positions of individual members of the apparatus are collected and used for determination or calibration of position of the object in space. The number of measured quantities during the motion of the platform with the measured or calibrated object is higher than the number of degrees of freedom of the apparatus by at least one.

7 Claims, 2 Drawing Sheets

U.S. PATENT DOCUMENTS

| | | | | |
|---|---|---|---|---|
| 2,803,063 | A * | 8/1957 | Scholtz | 33/523 |
| 3,264,556 | A * | 8/1966 | Krantz | 324/722 |
| 5,339,749 | A * | 8/1994 | Hirose | 108/143 |
| 6,070,335 | A * | 6/2000 | Pritschow | 33/568 |
| 6,328,510 | B1 * | 12/2001 | Hanrath et al. | 409/235 |
| 6,470,579 | B2 * | 10/2002 | Allen | 33/286 |
| 8,001,859 | B2 * | 8/2011 | McMurtry et al. | 73/866.5 |
| 2005/0135914 | A1 * | 6/2005 | Valasek et al. | 414/680 |
| 2006/0154198 | A1 * | 7/2006 | Durbin et al. | 433/29 |
| 2007/0097382 | A1 * | 5/2007 | Granger | 356/620 |
| 2008/0162005 | A1 * | 7/2008 | Tang et al. | 701/50 |

FOREIGN PATENT DOCUMENTS

| | | | |
|---|---|---|---|
| EP | 1228838 | A1 * | 8/2002 |
| FR | 2800659 | A1 * | 5/2001 |

OTHER PUBLICATIONS

Frederic Marquet et al., "Enchancing Parallel Robots Accuracy with Redundant Sensors", Proceedings of the 2002 IEEE, International Conference on Robotics & Automation, May 2002, pp. 4114-4119.

Fan LiangZhi et al., "Kinematic calibration for a hybrid 5DOF manipulator based on 3-RPS in-actuated parallel manipulator", The International Journal of Advanced Manufacturing Technology, Springer-Verlag, BE, vol. 25, No. 7-8, Apr. 1, 2005, pp. 730-734.

Zhuang et al., "Autonomous Calibration of Hexapod Machine Tools", Transactions of the American Society of Mechanical Engineers, Series B: Journal of Engineering for Industry, ASME. New York, vol. 122, No. 1, Feb. 2000, pp. 140-148.

* cited by examiner

METHOD AND APPARATUS FOR MEASUREMENT AND/OR CALIBRATION OF POSITION OF AN OBJECT IN SPACE

This application is a §371 national phase filing of PCT/CZ2006/000093 filed Dec. 20, 2006, and claims priority to CZ Appln. No. PV 2006-9 filed Jan. 4, 2006.

FIELD OF THE INVENTION

The invention concerns a method and an apparatus for measurement and/or calibration of position of an object in space. The apparatus consists of at least a single moving arm hinge-connected to a frame through one end and via the other end attached to a platform to be mounted on the measured or calibrated object, whereby the apparatus is equipped with sensors for reading the relative positions of individual members of the apparatus.

PRIOR ART

Determination or calibration of a point's, an object's or an aggregate's position in space represent important parameters in many fields of technology, such as machine tools, robotics, construction, etc.

Methods of measurement or calibration of position of a point, an object or an aggregate (further, all these three terms will be replaced by the single term "object") are based on determination of a single or more distances between one or more measurement systems and a reference element placed on an object or on measuring the angles between lines joining the measurement system and the reference element or angles relative to the base (frame), etc. The position of an object is then determined by finding the geometric relationships between the measured quantities by, for instance, triangulation or trigonometry.

The position of a point is defined by three cartesian coordinates, while the position of a body is defined by six coordinates (three position coordinates and three angle coordinates), while the position of an aggregate may be defined by various number of coordinates ranging from one to many. The term aggregate may denote, for instance, mutually linked bodies in space.

Current methods of determination of an object's position rely on measuring as many values as the number of degrees of freedom of the object in space, which equals the number of coordinates defining the position of the point, object or an aggregate in space Measuring several values, each of which practically involves certain error, results in significantly lower accuracy of the object position determination (owing to the effect of error accumulation) than in measuring a single distance or angle.

Another drawback of these methods of determination of position of an object in space is a costly preparation. It is due to the requirement for very precise manufacturing, calibration and adjustment of measurement devices and the lengthy preparation of the measurement itself owing to setup of the initial positions for the measurement.

It is possible to partially correct the above drawback of the measurement of an object's position in space by a solution comprising simultaneous measurements of distances of the object in question from four laser interferometers mounted on the base and subsequent solving of overdetermined equations not only for determination of a position of an object in space but also for the initial distances and positions of laser interferometers However, this only allows finding the position of a point in space but not the orientation of an object The resulting accuracy of the determined position of the object is insufficient, being poorer than that of the measurement of initial distances from individual laser interferometers. Moreover, this method only enables to determine the position of a point in space but not the orientation of an object.

Current methods of determination of position of an object in space are based mostly on measuring distances, most frequently with a laser interferometer, whereby the coordinates of individual points of a surface of the object in question are determined Besides this rather costly measurement method, which is chiefly due to the costs of laser interferometers, there is the need to use quite many components of the measuring apparatus including individual drives for each of the interferometers.

Therefore a laser tracker has been developed, which measures not only the distance from the reflector by means of a laser interferometer, but also the angular position of its beam and calculates the position of the reflector point in space with spherical coordinates. The problem with this device lies in that it achieves poorer accuracy in determination of the position of the reflector point in space as compared with the accuracy values of partial measurements, which is due to the accumulation of errors of measurement. Its further drawback is that it allows simultaneous determination of no more than three degrees of freedom of the point's position in space. It does not enable determination of six degrees of freedom of position of an object in space.

Another technique of measurement employs optical imaging with image capture by a camera or a light sensing element These pose the problems of low accuracy, where the accuracy is poorer than that of a laser interferometer. There is also the impossibility to simultaneously determine six degrees of freedom of an object's position in space.

Another well/known device for measurement or calibration of a position of an object in space is a coordinate measuring machine. Again, its drawback is the impossibility to simultaneously determine six degrees of freedom of a position of an object in space. Its further disadvantages include the poor accessibility of its operating space, the necessity to employ controlled drives and its large weight and dimensions.

For these reasons, techniques have been developed for calibration of a position of an object in space, which are based on measuring the positions of fixtures manufactured in advance, such as precise spheres mounted on beams or tetrahedra. Again, the problems include the impossibility to simultaneously determine six degrees of freedom of an object's position in space and to reach the whole operating space.

Another well known device for measurement or calibration of an object's position in space includes measuring arms consisting of at least two parts connected by a sliding joint The arm is attached with a U-joint to the platform on one end, while its other end is fixed to the frame in a rotating fashion, whereby the mounting of the platform to the measured or calibrated object involves guiding the object with the arm along a predetermined trajectory, while during such movement the distances of the object from the centre of rotation are measured and the distance readings used for determination of the position of the object in space or for its calibration. Similar known devices using such measuring arms employ the same principle as above but they differ in that the object does not travel along a circumference.

The aim of this invention is the method and apparatus for measuring and/or calibrating a position of an object in space, providing higher accuracy of determination of a measured object position as compared with other known devices, where the apparatus would be simpler and require lower investment cost while making the measurement of relevant quantities simpler.

SUMMARY OF THE INVENTION

The principle of the method of measurement and/or calibration of a position of an object in space according to this invention consists in that, upon attaching the platform of the measurement and/or calibration apparatus to the measured or calibrated object, these joined parts perform an arbitrary movement within object's operating space actuated by the drives of the object, while the quantities corresponding to relative positions of individual members of the apparatus are read and used for determination or calibration of position of the object in space. The number of measured quantities during the movement of the platform with the measured or calibrated object is higher than the number of degrees of freedom of the apparatus by at least one.

Prior to measurement and/or calibration of an object in space, a calibration of the apparatus for measurement and/or calibration of a position of an object in space is carried out by means of various movements of the object attached to the apparatus platform, where the quantities corresponding to relative positions of individual members of the apparatus are read. On the basis of thus read quantities, the relative position of the measurement or calibration apparatus to the measured or calibrated object is determined, as well as the relative positions of the joints of moving arms of the apparatus to the apparatus frame, where the number of measured quantities during the movement of the platform with the measured or calibrated object is higher than the number of degrees of freedom of the apparatus by at least one.

Preferably one or more measurements during the movement of the platform with the measured or calibrated object attached should indicate the relative angle of two members of the apparatus. The kinematic structure of at least one moving arms enable to simultaneously determine more than one degree of freedom of the object in space. This is most frequently achieved by performing two distance and/or angle measurements on at least one of the arms.

The principle of the apparatus for measurement and calibration of position of an object in space according to this invention consists in that the number of sensors for measuring the distances between individual points or individual angle displacements between members of the apparatus for reading the relative positions of individual parts of the arm and/or between individual parts of the arm and the frame and/or the platform and/or between the platform and the frame is higher than the number of degrees of freedom of the apparatus.

At least one of the arms is attached to the frame and the platform by a non-sliding joint connection whereby the arm consists of at least two parts mutually connected by a hinge- or slide joint or at least one of the arms is attached to the frame and the platform by a joint, whereby the joint/s to the frame or platform is/are mounted to the frame or platform through a sliding joint and the arm consists of a single or more parts joined by U-joints or sliding joints.

The advantage of the method and apparatus for measurement and/or calibration of a position of an object in space according to this invention is its simplification with the possibility to use the drives of the measured and/or calibrated object and cutting its investment costs. Also, the number of measurements, which is higher than the number of degrees of freedom of the apparatus results in greater accuracy of the measurement and/or calibration of the position of an object in space.

BRIEF DESCRIPTION OF DRAWINGS

The attached figures show the schematic of the apparatus for measurement and/or calibration of position of an object in space, where.

DESCRIPTION OF THE PREFERRED EMBODIMENTS

Figure 1:
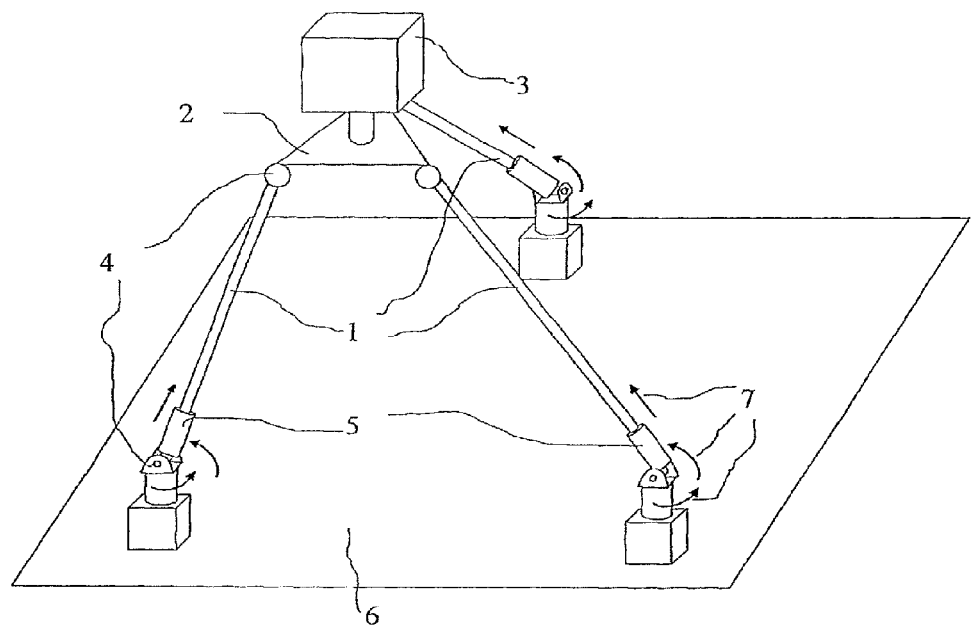
FIG. 1 presents one of the possible alternatives

According to FIG. 1, the apparatus consists of the frame 6, to which the moving arms 1 are attached with a swivel joint. The arms 1 rotate in the U-joint 4 mounted between the arm 1 and the frame 6 about both vertical and horizontal axes; generally: about two axes of rotation, and are fitted with a sliding way 5. The other end of the arm 1 is attached to the platform 2 by a spherical joint. Three arms 1 are attached to the platform 2, which implies that the movement of the platform 2 has six degrees of freedom During measurement or calibration, the measured object 3 is firmly attached to the platform 2. Furthermore, the apparatuses contain sensors 7 for measuring both horizontal and vertical angular positions of arms 1 and the displacement of the arm in the sliding way 5.

Figure 2:
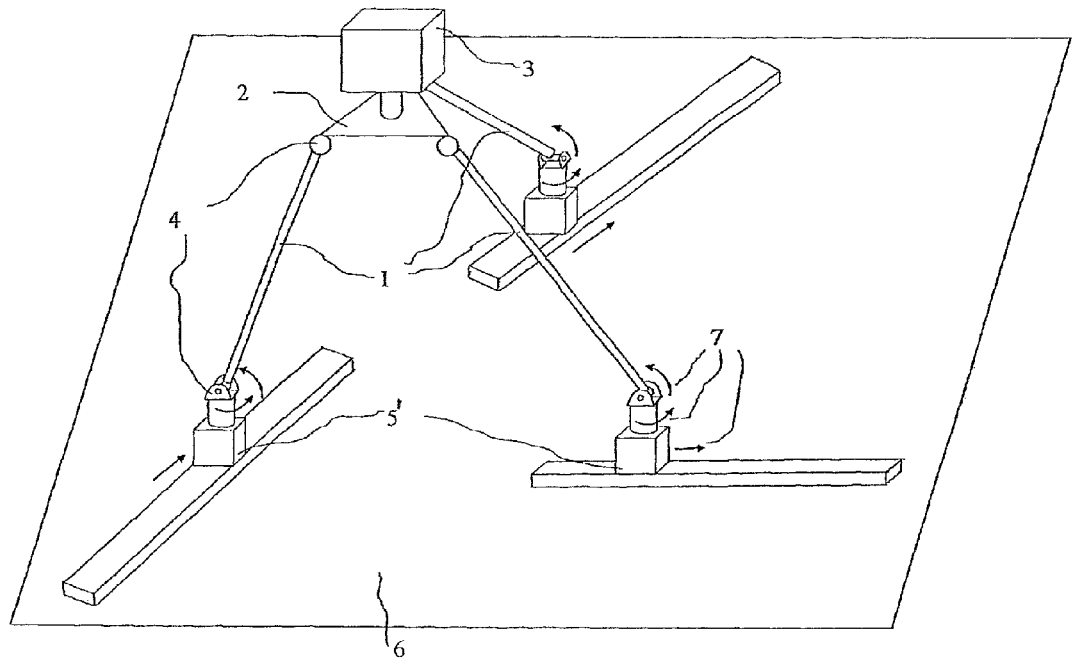
FIGS. 2 to 6 show further possible alternatives

According to FIG. 2, the three arms 1 are attached in a similar fashion to the platform 2, as shown in FIG. 1, whilst the joints 4 rotate about both vertical and horizontal axes and slide along the sliding ways 5 on the frame 6. Incorporation of the additional sliding ways 5' in this the apparatus arrangement example eliminates the sliding ways 5 incorporated in individual arms 1 of FIG. 1. Generally,the sliding ways 5' need not lie in a single plane; instead, they may lie in different planes of the frame 6.

Figure 3:
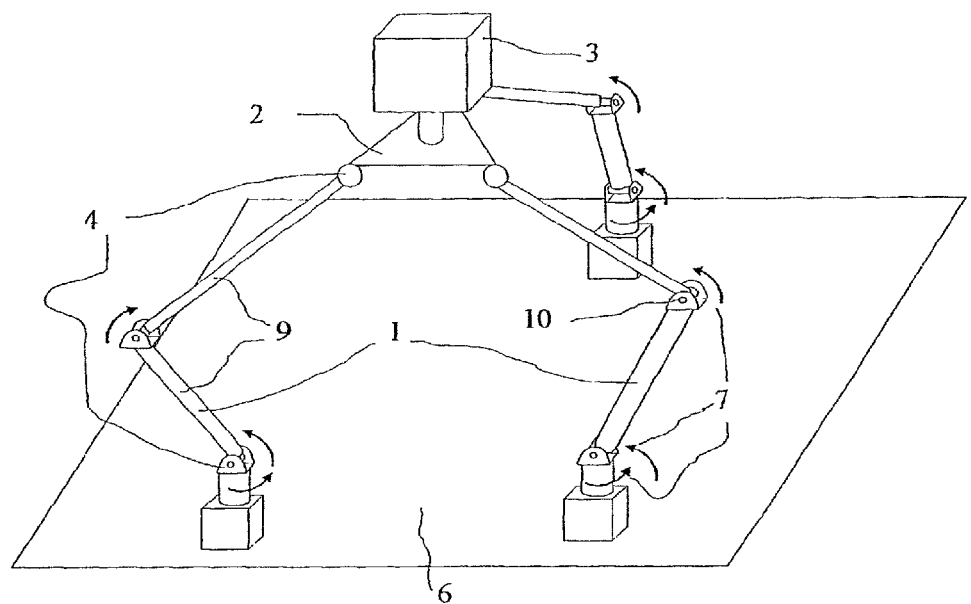

According to FIG. 3, individual arms are mounted to frame 6 in a fashion similar to that of FIG. 1 but the sliding ways in arms 1 are replaced with U-joints 10. Relative angular displacement of parts 9 of arms 1 are also read by sensors 7. All the above embodiments allow the simultaneous movements of the platform 2 with six degrees of freedom.

Figure 4:
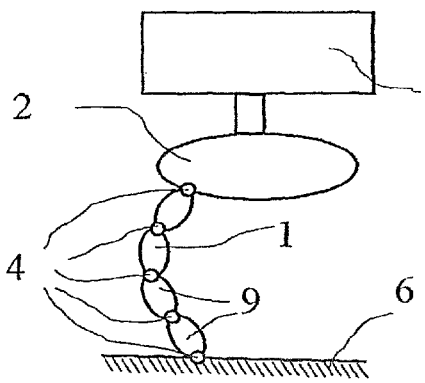
Figure 5:
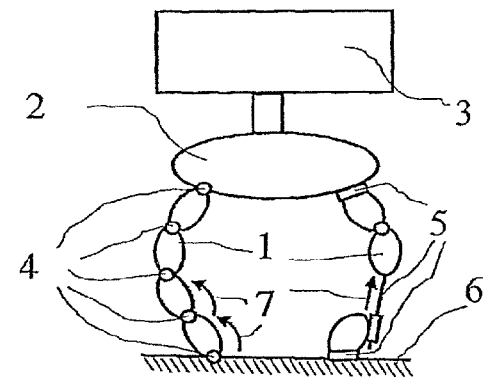
Figure 6:
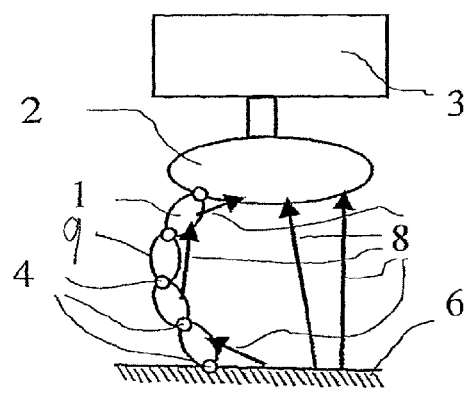

FIGS. 4 to 6 illustrate alternative embodiments of the apparatus for measurement and/or calibration of the position of an object in space, where FIG. 4 shows one of the arms 1 attached both to the frame 6 and the platform 2 by U-joints 4, where individual parts 9 of arms 1 are joined by U-joints as well. Unlike the FIG. 4, FIG. 5 shows an added arm 1, which is mounted both on frame 6 and on the platform 2 with sliding ways 5, while another sliding way 5 is arranged between two parts of the arm 1, here it is between the first and second parts as seen from the frame 6. Two parts of this arm 1 are joined with the joint 4.

As evident in all embodiments of the invention, the sensors 7 read individual distances or angular displacements between individual parts 9 of the arms 1, either neighbouring ones or, in general, any two parts 9 of the arm 1 or between parts 9 of the arms 1 and the frame 6 or between parts 9 of the arms 1 and the platform 2 or between the platform 2 and the frame 6, while the sensors 8 for relative positions of points read the distances between any points of the apparatus.

A significant feature of the apparatus according to the invention is the condition that the number of sensors for reading relative positions of individual members of the apparatus is greater than the number of the degrees of freedom of the apparatus. Typically, the number of degrees of freedom of the apparatus matches the number of degrees of freedom of the platform, but cases may occur, where the number of degrees of freedom of the apparatus is higher than the number of degrees of freedom of the platform. The apparatus shown in FIG. 5 may serve as an example, where the arms 1 consist or several parts 9, thus adding more degrees of freedom to the apparatus.

Another significant feature related to the method of measurement or calibration of a position of an object in space is the measurement of distance and angular relationships between individual parts of the apparatus during its movement across substantial portion of the operating or manipulation space of the measured or calibrated object, where the measured quantities by all sensors are read simultaneously from all sensors contained in the apparatus for meeting the redundancy condition. The preferred arrangement then includes at least one of the sensors being used for reading the relative angular position of some of two members of the apparatus.

Using the above described apparatus for measurement or calibration of an object in space (for the purpose of clarity, the object will be further referred to as the examined object) may involve the use of this apparatus, which itself is not calibrated. The actual calibration of the apparatus may be performed prior to its use for measurement and/or calibration of the examined object or its autocalibration may be performed together with the measurement and/or calibration of the examined object.

The measurement and/or calibration of the examined object, including the above mentioned autocalibration of the apparatus, entails the following steps:

1. The platform of the apparatus should be firmly attached to the examined object, which may be, for instance, a spindle or a gripper of a production machine.
2. then the production machine carries out various movements with the spindle or with the gripper across major portion of the operating space by means of its drives The term various movements refers to such movement, which involves the platform with the attached object moving across substantial portion of the operating space, enabling the acquisition of well-founded set of equations for determination and/or calibration of position of the examined object and, at the same time, involves active measurement by all sensors of the apparatus. During such movement, the number of measured quantities read should be larger than the number of degrees of freedom by at least one.
3. on the basis of all measured quantities from the overdetermined set of equations describing the coupling conditions of the measuring apparatus, the position of the measuring apparatus with respect to the production machine will be determined as well as the relative position of the supporting elements of the moving arms of the measuring apparatus and the autocalibration will be performed, i.e. the determination of position, of the measuring apparatus
4. upon this autocalibration, the examined object, such as a production machine, linked to the platform of the apparatus, will perform various movements again with a spindle or a gripper across the operating space. During such movement, the number of measured quantities collected, again, should be number than the number of degrees of freedom of the apparatus by at least one.
5. on the basis of thus measured redundant quantities, the position of the examined object or its calibration will be determined from the overdetermined set of equations describing the coupling conditions of the measuring apparatus If the actual apparatus for measurement and/or calibration of the position of an object in space has been calibrated prior to being used for measurement or calibration of the examined object, the actual measurement and/or calibration of the examined object should be performed from the point 4, i.e. with the repeated various movements across major portion of the operating space performed by the examined object, such as the production machine or its spindle or gripper attached to the platform of the apparatus. During such movement, the number of measured quantities collected, again, should be higher than the number of degrees of freedom of the apparatus by at least one. On the basis of thus measured redundant quantities, the position of the examined object or its calibration will be determined from the overdetermined set of equations describing the coupling conditions of the measuring apparatus

The invention claimed is:

1. Method for measuring or calibrating a position of an object in space using an apparatus having a frame, a platform to which the object is attached, a plurality of sensors, and a plurality of moving arms, each moving arm of the plurality of moving arms mounted to the frame at one end and to the platform at another end, the method comprising:
    driving the object attached to the platform across an operating space using a drive that is attached to or integrated into the object;
    sensing relative angular positions of individual members, the individual members including each moving arm of the plurality of moving arms, the frame, and the platform; and
    determining the position of the object or calibrating the position of the object using sensed, relative angular position data measured during movement of the object attached to the platform, the sensed, relative position data include a number of discrete data that is greater than a number of degrees of freedom of the apparatus.

2. The method of claim 1, wherein a number of sensed data corresponding to the relative angular positions of individual members is collected and used to determine the relative angular positions between the object and each moving arm of the plurality of moving arms,
    wherein the number of sensed data is greater than the number of degrees of freedom of the apparatus.

3. The method of claim 2, wherein sensing the relative angular positions of individual members includes at least one of:
    using measurements taken during the movement of the object to establish the relative angular position of two individual members of the apparatus;
    providing each moving arm with a kinematic structure that enables simultaneous determination of more than one degree of freedom of the object during movement; and
    taking a plurality of measurements of at least one of distance and an angle, which measurements are carried out on at least one moving arm.

4. The method of claim 1, characterized in that sensing relative angular positions of individual members includes taking at least one measurement during the movement of the object attached to the platform using relative angular positions of two individual members of the apparatus.

5. The method of claim 4, characterized in that moving the object attached to the platform includes providing each moving arm with a kinematic structure that enables simultaneous determination of more than one degree of freedom of the object during movement.

6. The method of claim 5, characterized in that sensing relative angular positions of individual members includes taking a plurality of measurements of at least one of a distance and an angular displacement on at least one moving arm of the plurality of moving arms.

7. The method as recited in claim 1, wherein determining the position of the object or calibrating the position of the object using sensed, relative angular position data includes:

upon attaching the platform to the object, performing arbitrary movement of the platform and object across the operating space of the object;

collecting data corresponding to positions of individual members of the apparatus; and using said data to determine relative positions of the object in space with the individual members of the apparatus.

* * * * *

UNITED STATES PATENT AND TRADEMARK OFFICE
CERTIFICATE OF CORRECTION

PATENT NO. : 8,297,103 B2
APPLICATION NO. : 12/159301
DATED : October 30, 2012
INVENTOR(S) : Michael Valaske et al.

Page 1 of 1

It is certified that error appears in the above-identified patent and that said Letters Patent is hereby corrected as shown below:

Title Page, Item (75) Inventors, reads as follows:

"Michael Valasek, Prague (CZ);
Frantisek Petru, Sezimovo Ústí (CZ);
Zbynek Sika, Prague (CZ); Václav Bauma, Prague (CZ); Roman Smid, Tabor (CZ)"

should read:

--Michael Valaske, Praha (CZ);
Frantisek Petru, Sezimovo Ústí (CZ);
Zbynek Sika, Praha (CZ); Václav Bauma, Praha (CZ); Roman Smid, Tabor (CZ)--;

Title Page, Item (73) Assignees, "Prague (CZ)" should read --Praha (CZ)--; and

In the Specification

Column 4, after line 55, please insert the following two paragraphs:

--Fig. 6 shows a single arm 1 between the frame 6 and the platform 2, which contains several parts 9 joined by U-joints 4, where the sensors 8 are used for reading the relative positions of points between different parts of the apparatus. Here, specifically, there is one sensor 8 for reading the relative positions of points between the frame 6 and first part of the arm 1, another sensor 8 for reading the relative positions of points between second and fourth parts of the arm 1, third sensor 8 for reading the relative position of points between the fourth part of the arm 1 and the platform 2 and further two sensors 8 for reading relative positions of points between the frame 6 and the platform 2.

Any of the joints 4 of the arm 1 can be replaced with a sliding way 5 and, in turn, any sliding way 5 can be replaced with a joint 4.--.

Signed and Sealed this
Seventeenth Day of September, 2013

Teresa Stanek Rea
*Deputy Director of the United States Patent and Trademark Office*